United States Patent Office 3,481,765
Patented Dec. 2, 1969

3,481,765
PROCESS FOR MANUFACTURING SHEET MATE-
RIALS HAVING A GOOD GAS PERMEABILITY
Shogo Nakajo, Nishinomiya, Shiro Sano, Toyonaka,
Kazuo Nagoshi, Kurashiki, and Katsutoshi Hosoda,
Takatsuki, Japan, assignors to Kurashiki Rayon
Co., Ltd., Kurashiki, Japan
No Drawing. Filed Feb. 21, 1967, Ser. No. 617,512
Claims priority, application Japan, Mar. 12, 1966,
41/15,507; Mar. 22, 1966, 41/17,841
Int. Cl. B44d 1/44; C09d 5/00
U.S. Cl. 117—63                      4 Claims

ABSTRACT OF THE DISCLOSURE

Manufacture of the sheet materials having a good gas permeability adapted for artificial leather by coating a substrata with a solution of polyurethane elastomer, said solution being adjusted to a viscosity at 30° C. of from 10 to 300 poises and to a concentration of from 15 to 30 percent, coagulating by bathing the coated substrata into a bath composed of a mixture of solvent and non-solvent for the elastomer, said solvent being in an amount of not more than 9 percent of the total amount of the bath, the temperature of said bath being above 60° C. and below the boiling point of the solvent or non-solvent, washing the resulting sheet materials with water and drying the resulting sheet materials.

---

The present invention relates to a method for manufacturing highly gas-permeable sheet materials, and more specifically to a method for manufacturing sheet materials adapted for use in substitution for leathers.

It has been known that sheet materials can be obtained by impregnating or coating fibrous substrata with polymer solutions and then treating the polymer solution layers with bath of non-solvent for the polymer or mixtures of non-solvent and solvent for the polymer thereby to coagulate said polymer solution layers and that the sheet materials thus obtained are used as substitutes for leathers.

As to the above mentioned process for the manufacture of sheet materials to be used in place of leathers, controls of the process steps have been considerably roughly defined at the present time. However, particulars of the steps to be controlled in order to manufacture desired leather-like sheets have not yet been clarified.

The object of the present invention is to provide an improved method for manufacturing highly gas permeable leather-like sheet materials from polyurethane elastomers.

Briefly, the method of the invention comprises the steps of coating a substrata with a polymer solution principally composed of a polyurethane elastomer, coagulating the polymer solution by wet process, and washing and drying the coated substrata thereby forming a sheet material, characterized in that (1) the polymer solution used is adjusted to a viscosity of from 10 to 300 poises at 30° C. and to a concentration of from 15 to 30%, and (2) the coating of said polymer solution is coagulated in a first coagulation bath consisting of a mixture of solvent for the polymer in amounts of not more than 9% and non-solvent for the polymer in amounts of more than 91%, of the total amount of the bath, at a temperature above 60° C. but below the boiling point of said non-solvent or solvent.

The present inventors have made extensive studies on the manufacture of sheet materials having microporous structures and which are dense but highly gas-permeable, by wet coagulation of polyurethane elastomers solutions. As a result, the present invention has been attained.

The polyurethane elastomers which have been examined by the present inventors to attain the above purpose, belong, in a broad sense, to a group of polyurethane elastomers obtained by reaction of a high molecular weight polymer glycol having terminal hydroxyl groups, an organic diisocyanate and a multifunctional chain extender having at least two active hydrogen atoms. Of these elastomers, however, the elastomers adapted for use in the present invention are limited to those prepared from an aliphatic polyester glycol as the high molecular weight polymer glycol, and a glycol such as ethylene glycol, propylene glycol, butylene glycol, or the like as the chain extender. Thus, while we can confidently declare that the present invention is practicable with the polyurethane elastomers defined in the restricted sense, it is yet to be studied and is not certain at present whether the invention is applicable as well to the polyurethane elastomers prepared from polyalkylene ether glycol as one component or to polyurethane-polyurea elastomers used in diamines such as hydrazine, hexamethylenediamine, etc. as the chain extender, because the polymers generally termed as polyurethane elastomers have a very broad scope and even if the present invention can be applicable to the particular polyurethane elastomer, one cannot predict that the invention would bring about similar results with the other polyurethane elastomers which have entirely different configurations.

In the present invention which has already been described briefly hereinbefore, the reason why the solvent concentration in the coagulation bath is limited to not more than 9% is based on the fact that a sheet material on which the polymer solution has been coagulated in a bath with a low solvent concentration attains better gas permeability than that of a sheet material coagulated in a bath having a higher solvent concentration. The reason why the bath temperature is kept above 60° C. is based on the fact that there is a danger of the polymer solution being so rapidly coagulated that it forms a skin layer in a bath at a low temperature because of the low solvent content of the bath according to the invention. The temperature above 60° C. is preferred in order to ensure moderate coagulation without any possibility of forming a skin layer due to rapid solidification. Lastly, description will be made of the concentration and viscosity of the solution to be applied. The solution is specified to have a concentration of not less than 15% but not more than 30% for the following reason. If the concentration is less than 15%, the shrinkage of the polymer on coagulation of the polymer solution will have a limit, with the result that macropores are formed. If the concentration is more than 30%, the structure of the product will become too dense. Thus, in either case, control of the temperature and composition of the coagulation bath will be rendered meaningless. The solution viscosity at 30° C. is restricted to the range of from 10 to 300 poises because outside the range, the products would be deteriorated in the physical properties, for example strength, rigidity and flexibility, as substitutes for leather.

The present invention is illustrated by the following examples, in which and elsewhere in this specification all parts and percent are by weight, unless otherwise specified.

Example 1 (and contrasts 1 and 2)

A solution in dimethylformamide (which may hereinafter be referred to as "DMF") of a polyurethane elastomer prepared from 25% of a polyurethane elastomer composed of polyethylene propylene (ethylene 9: propylene 1) adipate having a mean molecular weight of 2,000, diphenylmethane diisocyanate and ethylene glycol (at a molar ratio of 1:5:4) and 75% of dimethylformamide, was adjusted to a viscosity at 30° C. of 50 poises and then the solution was flowed and spread over a glass plate to a thickness of one millimeter.

The polymer solution thus spread was solidified by dipping in coagulation baths under the conditions as shown in Table 1 for 20 minutes. Each of the solidified samples was stripped from the glass plate, washed with water at 30° C. and dried at 100° C.

TABLE 1

|  | Composition of coagulation bath | | |
|---|---|---|---|
|  | Bath temp. (° C.) | DMF conc., percent | Water conc., percent |
| Example 1 | 90 | 5 | 95 |
| Contrast 1 | 50 | 5 | 95 |
| Contrast 2 | 50 | 50 | 50 |

The physical properties and the results of microscopic observation of the cross sections of the films thus obtatined were as shown in Table 2.

TABLE 2

|  | Apparent sp. gr. | Gas permeability, min. | Moisture permeability, (g./m.², 24 hr.) | Microscopic observation |
|---|---|---|---|---|
| Example 1 | 0.53 | 22 | 3,790 | Surface is somewhat fine but consists of micropores of less than about 20μ in size which are generally uniform throughout. |
| Contrast 1 | 0.49 | 290 | 1,020 | Macropores of 100 to 300μ in size are present below the surface skin. |
| Contrast 2 | 0.52 | 180 | 1,240 | Surface is somewhat fine but consists of micropores less than about 15μ in size which are generally uniform throughout. |

As seen from Table 2, the product of Example 1 possessed good gas permeability and the film when laminated on a soft, porous artificial leather substrata gave a suitable substitute for leather.

Example 2 (and contrast 3)

A solution was prepared from 24% of a polyurethane elastomer composed of polybutylene adipate having a molecular weight of 1,000, p,p'-diphenylmethane diisocyanate and 1,4-butane diol (at a molar ratio of 2:5:3), 1% of dispersed carbon black and 75% of DMF and the solution was adjusted to the viscosity at 30° C. to 60 poises. The resulting solution was applied on a soft, porous artificial leather substrata in a thickness of 1 mm.

The coated material was solidified by dipping in coagulation baths under the conditions given in Table 3 for 30 minutes. Thereafter, the product was washed with water at 40° C. for one hour and dried at 90° C.

TABLE 3

|  | Composition of coagulation bath | | |
|---|---|---|---|
|  | Bath temp. (° C.) | DMF conc., percent | Water conc., percent |
| Example 2 | 90 | 5 | 90 |
| Contrast 3 | 50 | 50 | 50 |

The exemplary and contrast sheet materials thus obtained both possessed a micropore coated layer and smooth surface but differed in permeability to gas and moisture as shown in Table 4. The example product was by far superior to the contrast as a substitute for leather.

TABLE 4

|  | Gas permeability (min.) | Moisture permeability (g./m.², 24 hr.) |
|---|---|---|
| Example 2 | 160 | 3,100 |
| Contrast 3 | 250 | 1,200 |

What we claim is:

1. In a method for manufacturing sheet materials which are dense and have good gas permeability by coating a substrata with a solution of polyurethane elastomer in organic solvent, said polymer solution having a viscosity at 30° C. of from 10 to 300 poises and a concentration of from 15 to 30 percent, coagulating the polymer solution by wet process, washing and drying the coated substrata thereby forming a sheet material, wherein the improvement comprises obtaining said polyurethane elastomer by reacting a high molecular weight aliphatic polyester glycol having hydroxyl groups on both terminals, an organic diisocyanate and a low molecular weight glycol having two active hydrogen atoms, and said polymer solution being coagulated in a first coagulation bath composed of a mixture of solvent and non-solvent and having a temperature of more than 60° C. and below the boiling point of the non-solvent or solvent, the amount of solvent being not more than 9 percent of the total weight of said mixture.

2. In a method according to claim 1, wherein the temperature of said first coagulation bath is about 90° C.

3. In a method according to claim 1, wherein the amount of solvent is about 5% of the total weight of said mixture.

4. In a method according to claim 1, wherein the temperature of said coagulation bath is about 90° C., and the amount of solvent is about 5% of the total weight of said mixture.

References Cited

UNITED STATES PATENTS

| 3,100,721 | 8/1963 | Holden | 117—135.5 |
| 3,208,875 | 9/1965 | Holden | 117—135.5 |
| 3,322,568 | 5/1967 | Golodner | 117—135.5 |

WILLIAM D. MARTIN, Primary Examiner

THEODORE G. DAVIS, Assistant Examiner

U.S. Cl. X.R.

117—135.5, 142, 161